United States Patent
Jia et al.

(10) Patent No.: US 11,477,732 B2
(45) Date of Patent: Oct. 18, 2022

(54) MANAGING TWT CLIENTS IN CONGESTED ENVIRONMENT

(71) Applicant: Hewlett Packard Enterprise Development LP, Houston, TX (US)

(72) Inventors: Xuguang Jia, Beijing (CN); Qiang Zhou, Sunnyvale, CA (US); Guangzhi Ran, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 39 days.

(21) Appl. No.: 17/110,839

(22) Filed: Dec. 3, 2020

(65) Prior Publication Data

US 2022/0182931 A1 Jun. 9, 2022

(51) Int. Cl.
*H04W 52/02* (2009.01)
*H04W 28/02* (2009.01)

(52) U.S. Cl.
CPC ... *H04W 52/0216* (2013.01); *H04W 28/0273* (2013.01); *H04W 52/0229* (2013.01)

(58) Field of Classification Search
CPC ............. Y02D 30/00; H04W 28/0221; H04W 72/0446; H04W 72/12; H04W 72/048; H04W 52/0229; H04L 2012/5675
See application file for complete search history.

(56) References Cited

U.S. PATENT DOCUMENTS

| | | | | |
|---|---|---|---|---|
| 10,187,905 B2* | 1/2019 | Chu | .................. | H04W 52/0216 |
| 2018/0295573 A1* | 10/2018 | Gidvani | ............ | H04W 52/0235 |
| 2019/0306794 A1* | 10/2019 | Ghosh | ............... | H04W 52/0216 |
| 2020/0229086 A1* | 7/2020 | Monajemi | ......... | H04W 72/1278 |
| 2020/0359327 A1* | 11/2020 | Bhanage | ........... | H04W 52/0248 |
| 2021/0297948 A1* | 9/2021 | Wang | ................ | H04W 52/0261 |

OTHER PUBLICATIONS

Nurchis et al, "Target Wake Time: Scheduled Access in IEEE 802.11ax WLANs", IEEE 2019 (Year: 2019).*

* cited by examiner

*Primary Examiner* — Omer S Mian
(74) *Attorney, Agent, or Firm* — Hewlett Packard Enterprise Patent Department

(57) ABSTRACT

In embodiments of the present disclosure, there is provided an approach for managing Target Wake Time (TWT) clients in a congested environment. According to embodiments of the present disclosure, a TWT client transmits, to an AP, a request to negotiate a schedule for a TWT session. The request comprises a first set of TWT parameters requested by the TWT client. The AP determines, based on respective sets of TWT parameters of existing TWT sessions and the first set of TWT parameters, a second set of TWT parameters for the TWT client to minimize overlap between the TWT session and the existing TWT sessions. The AP transmits a response comprising the second set of TWT parameters to the TWT client. Embodiments of the present disclosure provide an effective way for assigning air resources to multiple TWT clients in a congested environment, thereby reducing collisions among TWT sessions.

14 Claims, 6 Drawing Sheets

MANAGING TWT CLIENTS IN CONGESTED ENVIRONMENT

BACKGROUND

A mechanism called Target Wake Time (TWT) has been introduced in 802.11ax standard, which enables devices to determine when and how frequently they will wake up to transmit and/or receive data. The TWT mechanism allows an access point (AP) and a client device (also referred to as "TWT client" or "STA") to negotiate and define one or more TWT sessions to communication with each other. For example, the TWT client and the AP can negotiate parameters for a TWT session. After the TWT session is setup, the TWT client can go into a power-save mode and wake up to communicate with the AP according to the negotiated parameters. As such, the TWT mechanism can effectively increase device sleep time and significantly conserve battery life, especially for power sensitive devices.

BRIEF DESCRIPTION OF THE DRAWINGS

Embodiments of the present disclosure may be understood from the following Detailed Description when read with the accompanying Figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1:
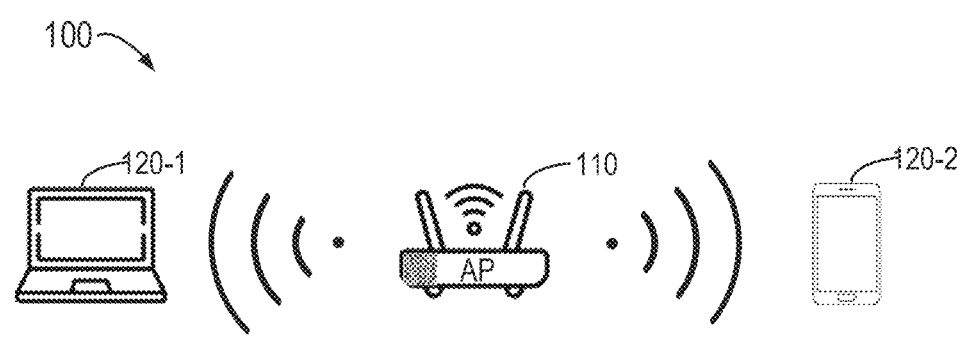
FIG. 1 illustrates an example environment in which embodiments of the present disclosure can be implemented.

The TWT mechanism allows an AP and a TWT client to negotiate and define one or more TWI sessions to communicate with each other. For example, the TWT client and the AP can negotiate parameters for a TWT session. After the TWT session is setup, the TWT client can go into a power-save mode and wake up to communicate with the AP according to the negotiated parameters.

A TWT session comprises a plurality of service periods (SPs). The term "service period" refers to a period of time during which the TWT client will wake up to transmit and/or receive data. For example, the TWT parameters for a TWT session may comprise a start offset indicating a start time of an initial SP, a duration of each SP (that is, the maximum time for the TWT client to wake up) and a time interval between two successive SPs. In the following, the start offset for a TWT session is also referred to as "TWT start offset" and represented as "TWT_start". The SP duration is also referred to as "TWT duration" and represented as "TWT_dur". The interval between two successive SPs is also referred to as "TWT interval" and represented as "TWT_intvl". The TWT parameters for a TWT session can be modified in response to a modification request from the TWT client or the AP.

The AP may establish different TWT sessions with multiple TWT clients. Wake-up durations of different TWT sessions may overlap with each other. Therefore, the TWT clients might have air resource collisions during their wake-up durations, such that they have to compete with random back-off time.

Traditionally, a total fair solution can be implemented to solve the above problem. According to the traditional solution, the AP may assign a same TWT duration and a same TWT interval to all TWT sessions. For example, the AP may set TWT_dur of all TWT sessions to a same value, such as, 10 time units (TU, for example, each time unit is 1 ms). The AP may also set TWT_intvl of all TWT sessions to Target Beacon Transmission Time (TBTT), such as, 100 ms. The AP may set TWT_start for a TWT session to be TBTT+ n*10TU, where n is an integer and n≥0. In this way, the air resources for different TWT sessions can be separated from each other.

This solution can work well for TWT clients with the same priority. However, for TWT clients with different priorities, they may request different TWT durations and/or TWT intervals. For example, a voice telephone may request a shorter TWT interval and a longer TWT duration, while a temperature monitoring device may request a longer TWT interval and a short TWT duration. This solution may be not applicable in these cases.

Embodiments of the present disclosure propose a way of managing TWT clients, which can consider different requirements of TWT clients and reduce the collisions among different TWT sessions. According to embodiments of the present disclosure, a TWT client transmits, to an AP, a request to negotiate a schedule for a TWT session. The request comprises a first set of TWT parameters requested by the TWT client. The AP determines, based on respective sets of TWT parameters of existing TWT sessions and the first set of TWT parameters, a second set of TWT parameters for the TWT client to minimize overlap between the TWT session and the existing TWT sessions. The AP transmits a response comprising the second set of TWT parameters to the TWT client. Then, the TWT client can go into a power-save mode and wake up to communicate with the AP according to the second set of TWT parameters.

Through the following descriptions of some example embodiments, it will be appreciated that embodiments of the present disclosure do not require limiting the TWT durations of all TWT sessions to a same value or limiting the TWT intervals of all TWT sessions to a same value. Instead, the TWT parameters assigned to a TWT session can be determined based on the requirement of the TWT client. As a result, an effective way can be implemented for assigning air resources to multiple TWT clients in a congested environment, thereby reducing collisions among TWT sessions.

Other advantages of embodiments of the present disclosure will be described with reference to the example implementation as described below. Reference is made below to FIG. 1 through FIG. 5 to illustrate basic principles and several example embodiments of the present disclosure herein.

FIG. 1 illustrates an example environment 100 in which embodiments of the present disclosure can be implemented. As shown in FIG. 1, the environment 100 comprises an AP 110 and client devices 120-1 and 120-2 (collectively or individually referred to as 120).

The AP 110 is a networking device that allows wireless devices to connect to a network such as Wide Area Network (WAN). Usually, the AP 110 may connect to a router or a switch, via a wired or wireless network, as a standalone device. It is also possible to implement the AP 110 as an integral component of the wireless router or the wireless switch. In operation, the AP 110 provides wireless connections to the client devices 120 using wireless Local Area Network (WLAN) technology, for example.

A client device 120 can be any end device that is capable of wireless communication. By way of example rather than limitation, a client device 120 may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME). USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like.

The communication between the AP 110 and the client device 120 in the environment 100 can be performed according to any suitable wireless communication protocol, for example, but not limited to, the 802.11ax standard. Both the AP 110 and the client device 120 are TWT-enabled devices. For example, the client device 120 may act as a TWT requester while the AP 110 may act as a TWT responder and scheduler which maintains TWT parameters for the TWT clients 120. In the following, the client device 120 can also be referred to as STA 120 or TWT client 120.

Different types of TWT operations can be implemented in the environment 100, including but not being limited to, individual TWT (iTWT) and broadcast TWT (bTWT), solicited TWT and unsolicited TWT, announced TWT and unannounced TWT, implicit TWT and explicit TWT, non-triggered TWT and trigger-enabled TWT, and so on.

In particular, the iTWT focuses on specific client sessions, which is mainly used for TWT clients to negotiate individual TWT agreements with an AP. The bTWT focuses on multi-client grouping, which is mainly used for TWT clients to establish membership in broadcast TWT schedules to an AP.

The solicited TWT means that the setup of a TWT session is initiated by a STA using a request. That is, the STA sends a TWT request to an AP and the AP sends a TWT response to the STA. The unsolicited TWT means that the setup of a TWT session is initiated by an AP, where the AP sends a TWT response with information about service periods which the STA has to accept. That is, there is no TWT request from the STA but only a TWT response from the AP.

The unannounced TWT means that an AP can send frames to a STA without any trigger from the STA as soon as a SP starts. The announced TWT means that an AP can send frames to a STA with a trigger from the STA as soon as a SP starts.

The implicit TWT means that a STA determines a start time for the next SP by adding a fixed value (that is, the TWT interval) to the start time of the current SP and indicates the determined start time in a field for the next SP. The explicit TWT means that a STA performs a frame exchange and receives information about the next SP from the responding AP.

The non-triggered TWT means that a STA does not need to wait for a trigger from an AP before it can send frames to the AP. The trigger-enabled TWT means that a STA needs to wait for a trigger from an AP before it can send frames to the AP.

In the environment 100 shown in FIG. 1, each TWT client 120 can establish more than one TWT sessions (for example, up to 8 TWT sessions) with the AP 110. Each of the TWT sessions may have one set of TWT parameters represented as {TWT_start, TWT_dur, TWT_intvl} as described above.

Figure 2:
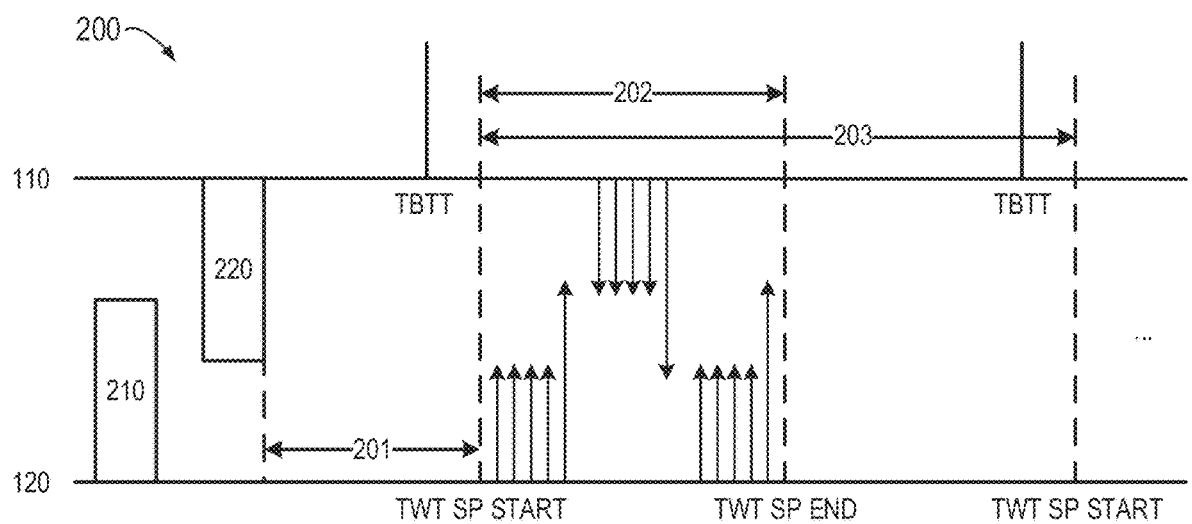
FIG. 2 illustrates a schematic diagram of a TWT session between an AP and a TWT client according to embodiments of the present disclosure.

FIG. 2 illustrates a schematic diagram of a TWT session 200 between the AP 110 and a TWT client 120 according to embodiments of the present disclosure. For example, the TWT session 200 is a non-triggered, solicited and individual TWT session. It is to be understood that the TWT session 200 is shown only for the purpose of illustration without suggesting any limitation as to the scope of the present disclosure. Embodiments of the present disclosure are also applicable to other types of TWT sessions.

As shown in FIG. 2, the TWT client 120 sends a TWT request 201 to the AP 110 to negotiate a schedule for the TWT session 200. Then, the AP 110 may send, to the TWT client 120, a TWT response 202 comprising TWT parameters for the TWT session 200. The TWT parameters for the TWT session 200 include a TWT_start offset 201 (that is, TWT_start), a TWT duration 202 (that is. TWT_dur) and a TWT interval 203 (that is, TWT_intvl). The TWT_start offset 201 indicates a start time of an initial SP. The TWT duration 202 indicates a period of time during which the TWT client 120 will wake up to communication with the AP 110. The TWT interval 203 indicates a time interval between two successive SPs. For example, in FIG. 2, TWT_start 201=TBTT+10TU, TWT_dur 202=40TU and TWT_intvl 203=100TU. Therefore, a TWT SP ranges from TBTT+10TU to TBTT+50TU.

Since the AP 110 may support to manage multiple TWT clients 120 and each TWT client 120 may establish a plurality of TWT sessions with the AP 110 having respective sets of TWT parameters, SPs of diffident TWT sessions may overlap with each other. Embodiments of the present disclosure propose a way of managing TWT clients to reduce the overlap among SPs of different TWT sessions.

Figure 3:
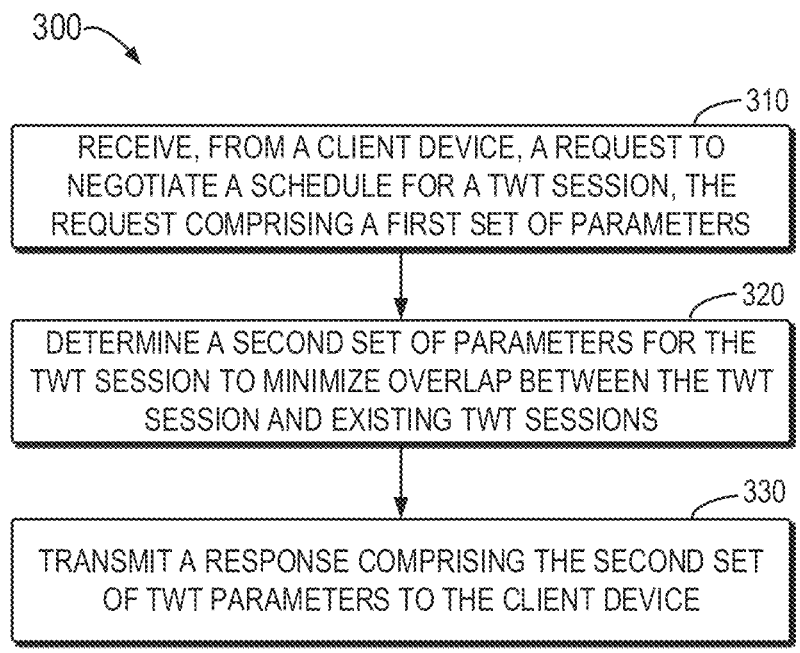
FIG. 3 illustrates a flow chart of an example method for managing TWT clients according to embodiments of the present disclosure.

FIG. 3 illustrates a flow chart of an example method 300 for managing TWT clients according to embodiments of the present disclosure. It is to be understood that the method 300 may be executed by the AP 110 as described with reference to FIGS. 1 and 2. In the following, the method 300 will be described in detail with reference to FIG. 1 from the perspective of the AP 110. It is to be understood that the method 300 may include additional blocks not shown and/or may omit some shown blocks, and the scope of the present disclosure is not limited in this regard.

At 310, the AP 110 receives, from a client device 120, a request to negotiate a schedule for a TWT session between the AP 110 and the client device 120. The request comprises a first set of TWT parameters requested by the client device 120. The TWT session comprises a plurality of SPs. In some embodiments, the first set of TWT parameters may comprise a first start offset indicating a start time of an initial SP, which is represented as "TWT_start_1". The first set of TWT parameters may also comprise a first duration of each SP, represented as "TWT_dur_1. The first set of TWT parameters may also comprise a first time interval between two successive SPs, represented as "TWT_intvl_1". That is, the first set of TWT parameters can be represented as {TWT_start_1, TWT_dur_1, TWT_intvl_1}.

At 320, the AP 110 determines, based on respective sets of TWT parameters of existing TWT sessions and the first set of TWT parameters, a second set of TWT parameters for the TWT session to minimize overlap between the TWT session and the existing TWT sessions.

In some embodiments, the AP 110 may determine, based on the first set of TWT parameters, a plurality of sets of candidate TWT parameters for the TWT session. The second set of TWT parameters can be selected from the plurality of sets of candidate TWT parameters for the TWT session.

In some embodiments, regarding the first TWT duration TWT_dur_1, the AP 110 may determine a plurality of candidate TWT durations based on a predetermined minimum TWT duration (also represented as "TWT_dur_min") and a predetermined maximum TWT duration (also represented as "TWT_dur_max"). The AP 110 may then select, from the plurality of candidate TWT durations, a second TWT duration closest to the first TWT duration. The second TWT duration is also represented as "TWT_dur_2" in the following. In this way, the suggested TWT parameters can be determined by considering the requirement of the client device.

By way of example rather than limitation, the predetermined minimum TWT duration may be 2 ms and the predetermined maximum TWT duration may be 64 ms. Each candidate TWT duration may be TWT_dur_min*$2^n$, where n is an integer and $$0 \le n \le \log_2 \frac{TWT\_dur\_max}{TWT\_dur\_min}.$$

That is, the second TWT duration may be selected from {2 ms, 4 ms, 8 ms, 16 ms, 32 ms, 64 ms}. For example, if the first TWT duration requested by the client device 120 is 7 ms, the AP 110 may determine the second TWT duration as 8 ms, which is closest to 7 ms among the candidates TWT durations.

In some embodiments, regarding the first TWT interval TWT_intvl_1, the AP 110 may determine a plurality of candidate TWT intervals based on a predetermined minimum TWT interval (also represented as "TWT_intvl_min") and a predetermined maximum TWT interval (also represented as "TWT_intvl_max"). The AP 110 may then select, from the plurality of candidate TWT intervals, a second TWT interval closest to the first TWT interval. The second TWT interval is represented as "TWT_intvl_2" in the following. In this way, the suggested TWT parameters can be determined by considering the requirement of the client device.

By way of example rather than limitation, the predetermined minimum TWT interval may be TBTT (for example, 100 ms) and the predetermined maximum TWT interval may be 4 TBTT (for example, 400 ms). Each candidate TWT interval may be TWT_invl_min*$2^m$, where m is an integer and $$0 \le m \le \log_2 \frac{TWT\_intvl\_max}{TWT\_intvl\_min}.$$

That is, the second TWT duration may be selected from {TBTT, 2 TBTT, 4 TBTT}. For example, if the first TWT interval requested by the client device 120 is 2.5 TBTT, the AP 110 may determine the second TWT interval as 2 TBTT, which is closest to 2.5 TBTT among the candidates TWT intervals.

In some embodiments, in response to determining the second TWT duration TWT_dur_2 and the second TWT interval TWT_intvl_2, the AP 110 may determine, based on the second TWT duration and the second TWT interval, a plurality of candidate TWT start offsets for the TWT session. For example, each candidate TWT start offset may be TWT_dur_min*p, where p is an integer and 0≤p≤ (TWT_intvl_2−TWT_dur_2)/TWT_dur_min.

In some embodiments, in response to determining the second TWT duration, the second TWT interval and the plurality of candidate TWT_start offsets, the AP 110 may generate the plurality of sets of candidate TWT parameters, where each set of candidate TWT parameters comprise the second duration, the second time interval and one of the candidate start offsets. That is, each set of candidate TWT parameters can be represented as {TWT_dur_min*p, TWT_dur_2, TWT_intvl_2}, where p is an integer and 0≤p≤ (TWT_intvl_2−TWT_dur_2)/TWT_dur_min.

Alternatively, or in addition, in some embodiments, the maximum TWT interval can be divided into a plurality of time slots, so as to facilitate following calculation. For example, each time slot may have a length of TWT_dur_min. That is, the number of time slots can be determined as: TWT_slot_num=TWT_intvl_max/TWT_dur_min. In this way, air resources can be allocated to different TWT sessions in units of time slots in the congested environment. For example, each set of candidate TWT parameters can be represented in units of time slots.

In some embodiments, the AP 110 may determine, based on each set of candidate TWT parameters comprises in the plurality of sets of candidate TWT parameters, first air resource usage of the TWT session when applying the set of candidate TWT parameters. For example, the first air resource usage can be represented as a vector R {$r_0$, $r_1$, . . . , $r_n$}, where n=TWT_slot_num and if slot i (i∈[0, n]) is located within the wake-up duration indicated by the each set of candidate TWT parameters, then $r_i$=TWT_intvl_max/TWT_intvl_2, otherwise $r_i$=0.

In some embodiments, the AP 110 may determine, based on respective sets of TWT parameters assigned to existing TWT sessions, second air resource usage of the existing TWT sessions. For example, regarding each existing TWT session s, the AP 110 can determine its corresponding air resource usage as a vector R_s. It is to be understood that, the air resource usage R_s of each existing TWT session s can be determined in a same way as the first air resource usage as described above. Then, the AP 110 can determine the second air resource usage by accumulating the vectors R_s for all the existing TWT sessions. For example, the second air resource usage can be represented as a vector E=$\Sigma_{s=1}^{N}$R_s, where N represents the number of exiting TWT sessions. The modulus of the vector E can reflect an overlap degree of the existing TWT sessions.

In some embodiments, the AP 110 may determine, for each set of candidate TWT parameters comprises in the plurality of sets of candidate TWT parameters, an overlap degree between the existing TWT sessions and the TWT session when applying the each set of candidate TWT parameters. For example, the overlap degree can be determined as: E·R=|E|·|R|·cos θ, where θ represents an angle between the vectors E and R. As such, the AP 110 can determine, based on the plurality of sets of candidate TWT parameters, respective overlap degrees between the existing TWT sessions and the TWT session. Then, the AP 110 may select, from the plurality of sets of candidate TWT parameters, the second set of TWT parameters associated with the minimum overlap degree. In this way, by applying the second set of TWT parameters to the TWT session, collisions among different TWT sessions can be minimized. For example, the second set of TWT parameters may comprise the second TWT duration TWT_dur_2, the second TWT interval TWT_intvl_2 and one of the candidate TW T start offsets associated with the minimum overlap degree, represented as "TWT_start_2". Thus, the second set of TWT parameters to be suggested to the client device 120 can be represented as {TWT_start_2, TWT_dur_2, TWT_intvl_2}.

Figure 4A:
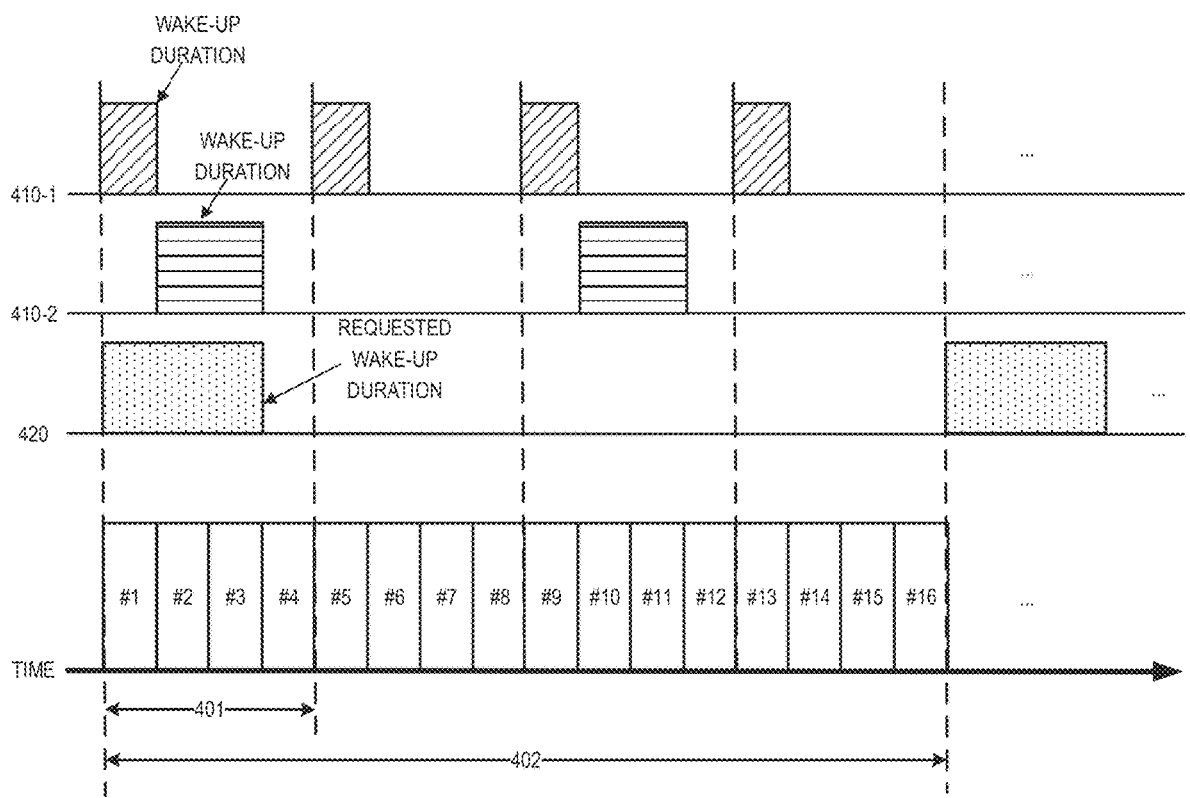
FIGS. 4A and 4B illustrate an example for minimizing overlap between TWT sessions according to embodiments of the present disclosure.
Figure 4B:
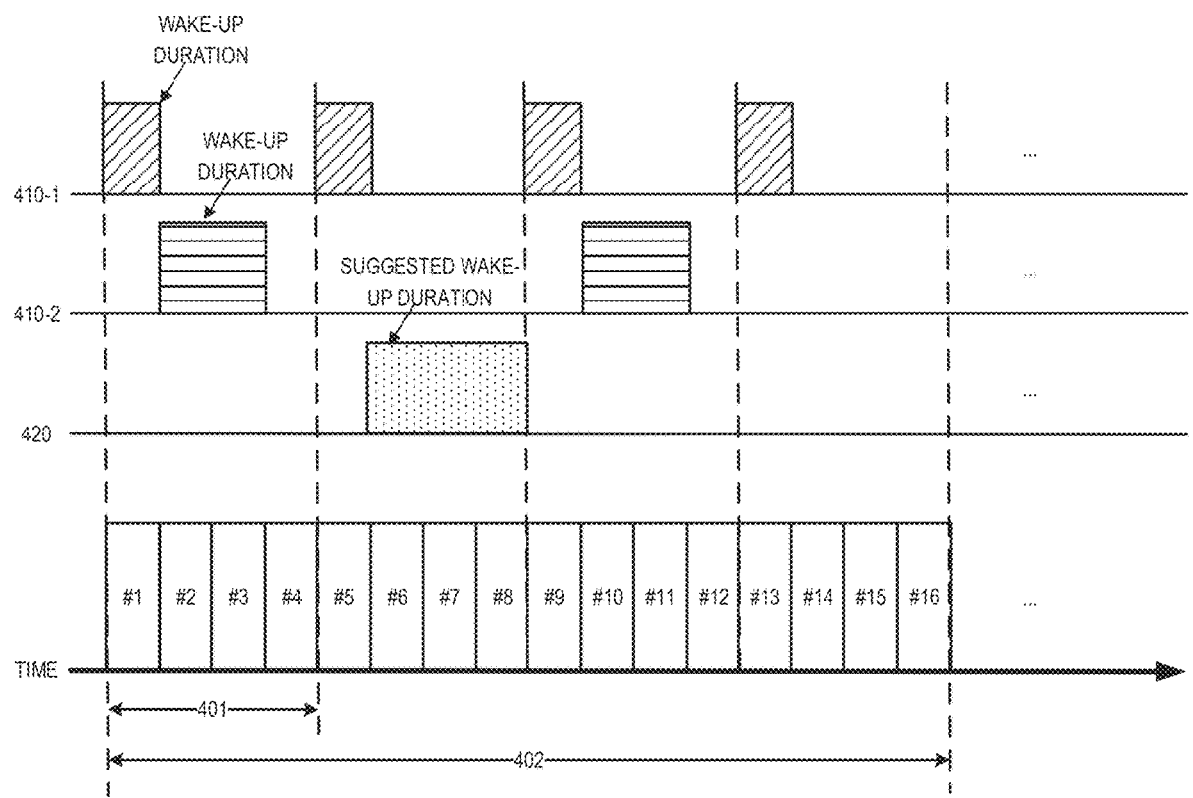

FIGS. 4A and 4B illustrate an example for minimizing overlap between TWT sessions according to embodiments of the present disclosure. In FIGS. 4A and 4B, it is assumed that the minimum TWT duration (that is, TWT_dur_min) is 25 ms, the minimum TWT interval (that is, TWT_intvl_min) 401 is 100 ms and the maximum TWT interval (that is, TWT_intvl_max) 402 is 400 ms. That is, the maximum TWT interval can be divided into 16 time slots each with a length of 25 ms.

FIG. 4A shows two existing TWT sessions 410-1 and 410-2 (collectively referred to as "existing TWT sessions 410"). For example, the air resource usage of the TWT session 410-1 may be represented as a vector R_1={4, 0, 0, 0, 4, 0, 0, 0, 4, 0, 0, 0, 4, 0, 0, 0} and the air resource usage of the TWT session 410-2 can be represented as a vector R_2={0, 2, 2, 0, 0, 0, 0, 0, 0, 2, 2, 0, 0, 0, 0, 0}. That is, the total air resource usage of the existing TWT sessions 410 is: E=R_1+R_2={4, 2, 2, 0, 4, 0, 0, 0, 4, 2, 2, 0, 4, 0, 0, 0}.

FIG. 4A also shows a new TWT session 420 to be established. For example, the requested TWT parameters for the new TWT session 420 are {0, 75 ms, 400 ms}, where the requested start offset is 0, the requested TWT duration is 75 ms and the requested TWT interval is 400 ms. The air resource usage of the requested TWT parameters can be represented as a vector R={1, 1, 1, 0, 0, 0, 0, 0, 0, 0, 0, 0, 0, 0, 0, 0}. If the requested TWT parameters are applied to the TWT session 420, the total air resource usage of the existing TWT sessions 410 and the new TWT session 420 is: E=R_1+R_2+R={5, 3, 3, 0, 4, 0, 0, 0, 4, 2, 2, 0, 4, 0, 0, 0}, where |E|=√99.

According to embodiments of the present disclosure, the candidate start offsets for the new TWT session 420 may include {0, 1, 2 . . . . . (400−75)/25} slots. One of the candidate start offsets associated with the minimum overlap degree between the exiting TWT sessions 410 and the TWT session 420 is 5 slots. That, the suggested TWT parameters for the new TWT session 420 are {125 ms, 75 ms, 400 ms}.

FIG. 4B shows air resource usage of the new TWT session 420 with the suggested TWT parameters. For example, the air resource usage of the new TWT session 420 with the suggested TWT parameters can be represented as a vector R={0, 0, 0, 0, 0, 1, 1, 1, 0, 0, 0, 0, 0, 0, 0, 0}. As such, the total air resource usage of the existing TWT sessions 410 and the new TWT session 420 is: E=R_1+R_2+R={4, 2, 0, 4, 1, 1, 1, 4, 2, 2, 0, 4, 0, 0}, where |E|=√83<√99. This indicates that compared with the requested TWT parameters, the suggested TWT parameters can reduce the overlap between the TWT sessions 410 and 420.

Figure 5:
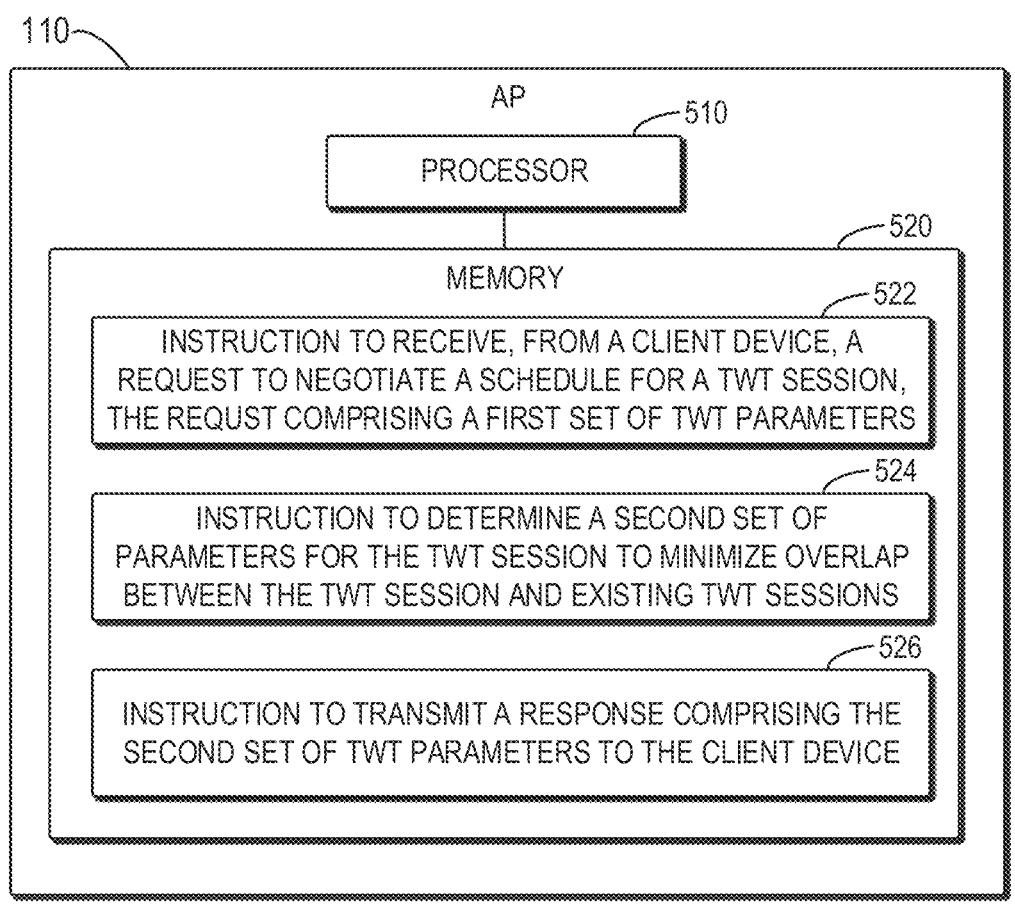
FIG. 5 illustrates an example AP according to embodiments of the present disclosure.

FIG. 5 illustrates an example AP 110 according to embodiments of the present disclosure. The AP 110 comprises a processor 510 and a memory 520 coupled to the processor 510. The memory 520 stores instructions 522, 524 and 526 to cause the processor 510 to perform some acts.

As shown in FIG. 5, the memory 520 stores instruction(s) 522 to receive, from a client device, a request to negotiate a schedule for a TWT session between the AP 110 and the client device, the request comprising a first set of TWT parameters requested by the client device.

In some embodiments, the TWT session comprises a plurality of service periods and the first set of TWT parameters comprises a first start offset indicating a start time of an initial service period, a first duration of each service period and a first time interval between two successive service periods.

As shown in FIG. 5, the memory 520 stores instruction(s) 524 to determine, based on respective sets of TWT parameters of existing TWT sessions and the first set of TWT parameters, a second set of TWT parameters for the TWT session to minimize overlap between the TWT session and the existing TWT sessions.

In some embodiments, the AP 110 may determine, based on the first set of TWT parameters, a plurality of sets of candidate TWT parameters for the TWT session. The AP 110 may determine, based on the plurality of sets of candidate TWT parameters and the sets of TWT parameters of the existing TWT sessions, overlap degrees between the existing TWT sessions and the TWT session. The AP 110 may select, from the plurality of sets of candidate TWT parameters, the second set of TWT parameters corresponding to the minimum one of the overlap degrees. In this way, by applying the second set of TWT parameters to the TWT session, collisions among different TWT sessions can be minimized.

In some embodiments, in order to determine the plurality of sets of candidate TWT parameters, the AP 110 may determine, from a plurality of candidate durations, a second duration closest to the first duration. The AP 110 may determine, from a plurality of candidate time intervals, a second time interval closest to the first time interval. The AP 110 may determine, based on the second duration and the second time interval, a plurality of candidate start offsets for the TWT session. The AP 110 may generate the plurality of sets of candidate TWT parameters each comprising the second duration, the second time interval and one of the candidate start offsets. In this way, the suggested TWT parameters can be determined by considering the requirement of the client device.

In some embodiments, the AP 110 may determine, based on predetermined minimum and maximum durations, the plurality of candidate durations. The AP 110 may determine, based on predetermined minimum and maximum time intervals, the plurality of candidate time intervals. In this way, centralized air resource management can be implemented for all the TWT sessions.

In some embodiments, in order to determine overlap degrees between the TWT session and the existing TWT sessions, the AP 110 may determine, based on each set of candidate TWT parameters comprises in the plurality of sets of candidate TWT parameters, first air resource usage of the TWT session applying the each set of candidate TWT parameters. The AP 110 may determine, based on the sets of TWT parameters of the existing TWT sessions, second air resource usage of the existing TWT sessions. The AP 110 may determine, based on the first air resource usage and the second air resource usage, an overlap degree between the existing TWT sessions and the TWT session.

In some embodiments, in order to select the second set of TWT parameters corresponding to the minimum one of the overlap degrees, the AP 110 may select, from the plurality of candidate start offsets, a second start offset corresponding to the minimum one of the overlap degrees. The AP 110 may generate the second set of parameters comprising the second duration, the second time interval and the second start offset. In this way, the second set of TWT parameters can minimize collisions among different TWT sessions.

As shown in FIG. 5, the memory 520 stores instruction(s) 526 to transmit, to the client device, a response comprising the second set of TWT parameters.

In some embodiments, the memory 520 further stores instruction(s) to communicate with the client device based on the second set of TWT parameters.

In this way, embodiments of the present disclosure provide a way of managing TWT clients, which can consider different requirements of TWT clients and reduce the collisions among different TWT sessions. Embodiments of the present disclosure do not require limiting the TWT duration of all TWT sessions to a same value or limiting the TWT interval of all TWT sessions to a same value. Instead, the TWT parameters assigned to a TWT session can be determined based on the parameters requested by the TWT client. As a result, a more effective way can be implemented for assigning air resources to multiple TWT clients in a congested environment, thereby reducing collisions among TWT sessions.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate embodiments may also be implemented in combination in a single implementation. Conversely, various features that are described in the context of a single implementation may also be implemented in multiple embodiments separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:
1. An access point comprising:
a processor; and
a memory coupled to the processor, the memory storing instructions to cause the processor to perform acts comprising:
receiving, from a client device, a request to negotiate a schedule for a target wakeup time (TWT) session between the AP and the client device, the request comprising a first set of TWT parameters requested by the client device;
determining, based on respective sets of TWT parameters of existing TWT sessions and the first set of TWT parameters, a second set of TWT parameters for the TWT session to minimize overlap between the TWT session and the existing TWT sessions, wherein determining the second set of TWT parameters comprises:
determining, based on the first set of TWT parameters, a plurality of sets of candidate TWT parameters for the TWT session;
determining, based on the plurality of sets of candidate TWT parameters and the sets of TWT parameters of the existing TWT sessions, overlap degrees between the existing TWT sessions and the TWT session by:
determining, based on each set of candidate TWT parameters comprises in the plurality of sets of candidate TWT parameters, first air resource usage of the TWT session applying the each set of candidate TWT parameters;
determining, based on the sets of TWT parameters of the existing TWT sessions, second air resource usage of the existing TWT sessions; and
determining, based on the first air resource usage and the second air resource usage, an overlap degree between the existing TWT sessions and the TWT session;
selecting, from the plurality of sets of candidate TWT parameters, the second set of TWT parameters corresponding to the minimum one of the overlap degrees; and
transmitting, to the client device, a response comprising the second set of TWT parameters.
2. The access point according to claim 1, wherein the TWT session comprises a plurality of service periods and the first set of TWT parameters comprises a first start offset indicating a start time of an initial service period, a first duration of each service period and a first time interval between two successive service periods, and the determining a plurality of sets of candidate TWT parameters comprises:
determining, from a plurality of candidate durations, a second duration closest to the first duration;
determining, from a plurality of candidate time intervals, a second time interval closest to the first time interval;
determining, based on the second duration and the second time interval, a plurality of candidate start offsets for the TWT session; and generating the plurality of sets of candidate TWT parameters each comprising the second duration, the second time interval and one of the candidate start offsets.

3. The access point according to claim 2, wherein the selecting the second set of TWT parameters corresponding to the minimum one of the overlap degrees comprises:
selecting, from the plurality of candidate start offsets, a second start offset corresponding to the minimum one of the overlap degrees; and
determining the second set of parameters based on the second duration, the second time interval and the second start offset.

4. The access point according to claim 2, wherein the acts further comprise:
determining, based on predetermined minimum and maximum durations, the plurality of candidate durations.

5. The access point according to claim 2, wherein the acts further comprise:
determining, based on predetermined minimum and maximum time intervals, the plurality of candidate time intervals.

6. The access point according to claim 1, wherein the acts further comprise:
communicating with the client device based on the second set of TWT parameters.

7. A method comprising:
receiving, at an access point (AP) and from a client device, a request to negotiate a schedule for a target wakeup time (TWT) session between the AP and the client device, the request comprising a first set of TWT parameters requested by the client device;
determining, based on the first set of TWT parameters and information about existing TWT sessions, a second set of TWT parameters for the TWT session to minimize overlap between the TWT session and the existing TWT sessions, wherein determining the second set of TWT parameters comprises:
determining, based on the first set of TWT parameters, a plurality of sets of candidate TWT parameters for the TWT session;
determining, based on the plurality of sets of candidate TWT parameters and the sets of TWT parameters of the existing TWT sessions, overlap degrees between the existing TWT sessions and the TWT session by:
determining, based on each set of candidate TWT parameters comprises in the plurality of sets of candidate TWT parameters, first air resource usage of the TWT session applying the each set of candidate TWT parameters;
determining, based on the sets of TWT parameters of the existing TWT sessions, second air resource usage of the existing TWT sessions; and
determining, based on the first air resource usage and the second air resource usage, an overlap degree between the existing TWT sessions and the TWT session;
selecting, from the plurality of sets of candidate TWT parameters, the second set of TWT parameters corresponding to the minimum one of the overlap degrees; and
transmitting, to the client device, a response comprising the second set of TWT parameters.

8. The method according to claim 7, wherein the TWT session comprises a plurality of service periods and the first set of TWT parameters comprises a first start offset indicating a start time of an initial service period, a first duration of each service period and a first time interval between two successive service periods, and the determining a plurality of sets of candidate TWT parameters comprises:
determining, from a plurality of candidate durations, a second duration closest to the first duration;
determining, from a plurality of candidate time intervals, a second time interval closest to the first time interval;
determining, based on the second duration and the second time interval, a plurality of candidate start offsets for the TWT session; and
generating the plurality of sets of candidate TWT parameters each comprising the second duration, the second time interval and one of the candidate start offsets.

9. The method according to claim 8, wherein the selecting the second set of TWT parameters corresponding to the minimum one of the overlap degrees comprises:
selecting, from the plurality of candidate start offsets, a second start offset corresponding to the minimum one of the overlap degrees; and
determining the second set of parameters based on the second duration, the second time interval and the second start offset.

10. The method according to claim 8, further comprising:
determining, based on predetermined minimum and maximum durations, the plurality of candidate durations.

11. The method according to claim 8, further comprising:
determining, based on predetermined minimum and maximum time intervals, the plurality of candidate time intervals.

12. The method according to claim 7, further comprising:
communicating with the client device based on the second set of TWT parameters.

13. A non-transitory computer readable medium storing instructions which, when executed by a processor of a device, cause the device to perform acts comprising:
receiving, from a further device, a request to negotiate parameters for a target wakeup time (TWT) session between the device and the further device, the request comprising a first set of TWT parameters requested by the further device;
determining, based on the first set of TWT parameters and information about existing TWT sessions, a second set of TWT parameters for the TWT session to minimize overlap between the TWT session and the existing TWT sessions, wherein determining a second set of TWT parameters comprises:
determining, based on the first set of TWT parameters, a plurality of sets of candidate TWT parameters for the TWT session;
determining, based on the plurality of sets of candidate TWT parameters and the sets of TWT parameters of the existing TWT sessions, overlap degrees between the existing TWT sessions and the TWT session by:
determining, based on each set of candidate TWT parameters comprises in the plurality of sets of candidate TWT parameters, first air resource usage of the TWT session applying the each set of candidate TWT parameters;
determining, based on the sets of TWT parameters of the existing TWT sessions, second air resource usage of the existing TWT sessions; and
determining, based on the first air resource usage and the second air resource usage, an overlap degree between the existing TWT sessions and the TWT session;

selecting, from the plurality of sets of candidate TWT parameters, the second set of TWT parameters corresponding to the minimum one of the overlap degrees; and transmitting, to the further device, a response comprising the second set of TWT parameters.

14. The non-transitory computer readable medium according to claim 13, wherein the acts further comprise:

communicating with the further device based on the second set of TWT parameters.

* * * * *